Figure 1:
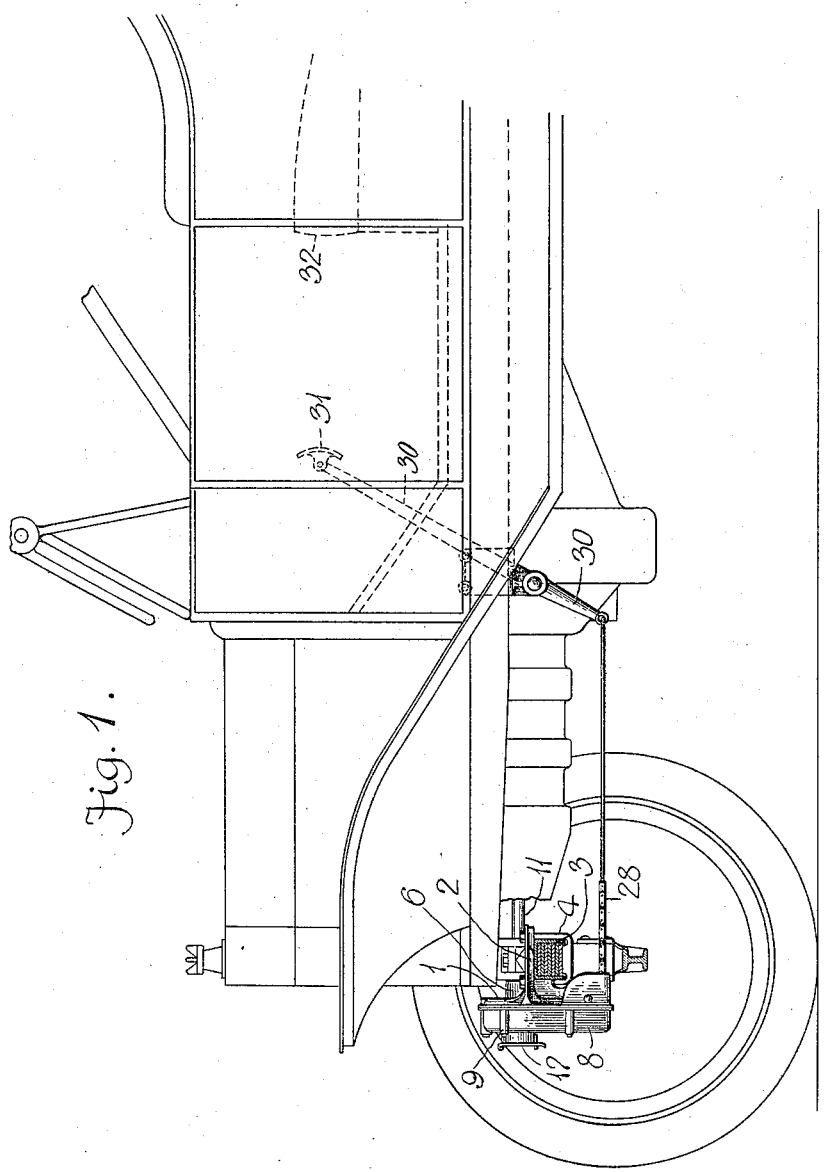

C. R. CRARY.
EXPLOSIVE ENGINE STARTER.
APPLICATION FILED APR. 3, 1915.

1,176,737.

Patented Mar. 28, 1916.
3 SHEETS—SHEET 1.

Witnesses
Chas. W. Stauffiger
Anna M. Dorr.

Inventor
Cecil R. Crary,
By
Attorneys

C. R. CRARY.
EXPLOSIVE ENGINE STARTER.
APPLICATION FILED APR. 3, 1915.
1,176,737.
Patented Mar. 28, 1916.
3 SHEETS—SHEET 2.
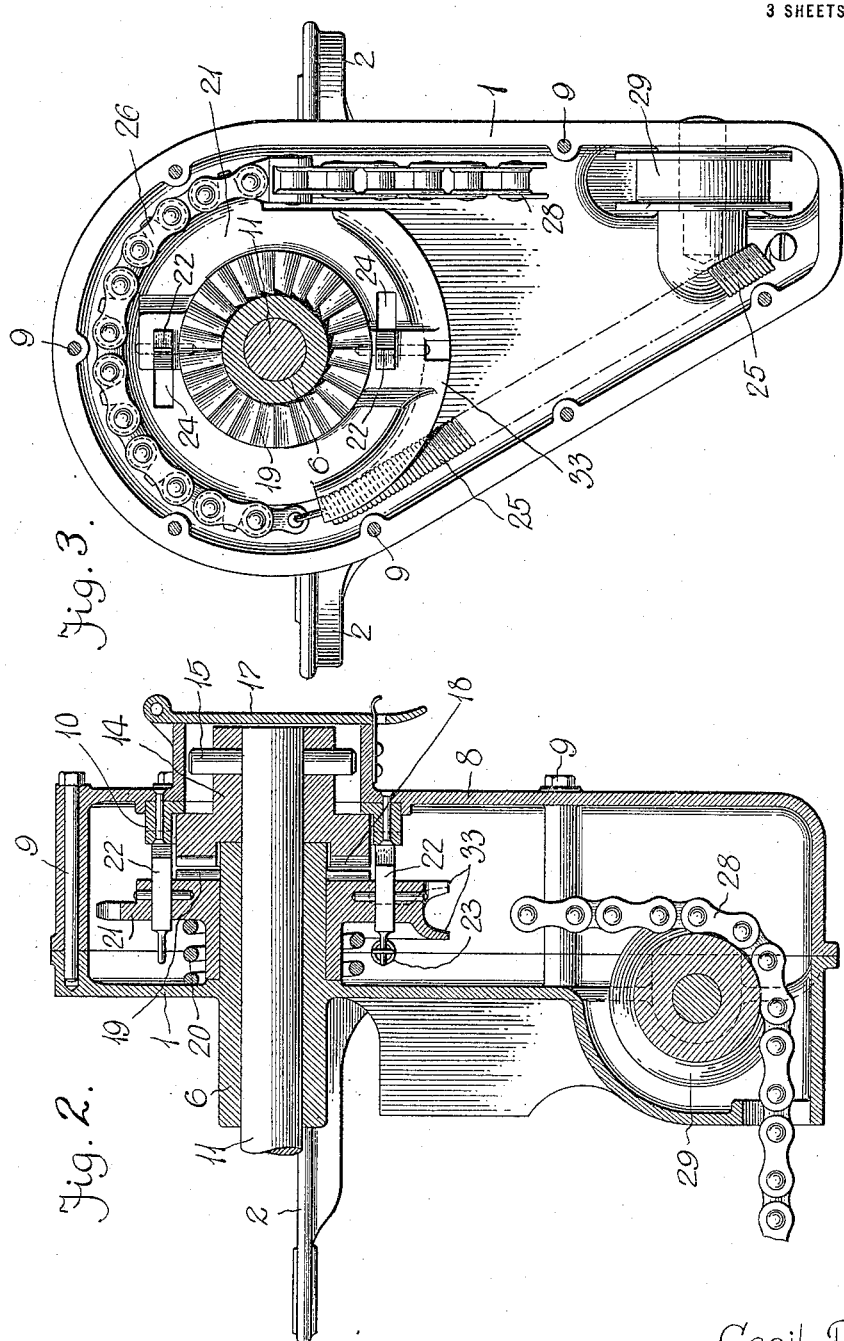
Witnesses
Chas. W. Stauffiger
Anna M. Dow
Inventor
Cecil R. Crary,
By 
Attorneys

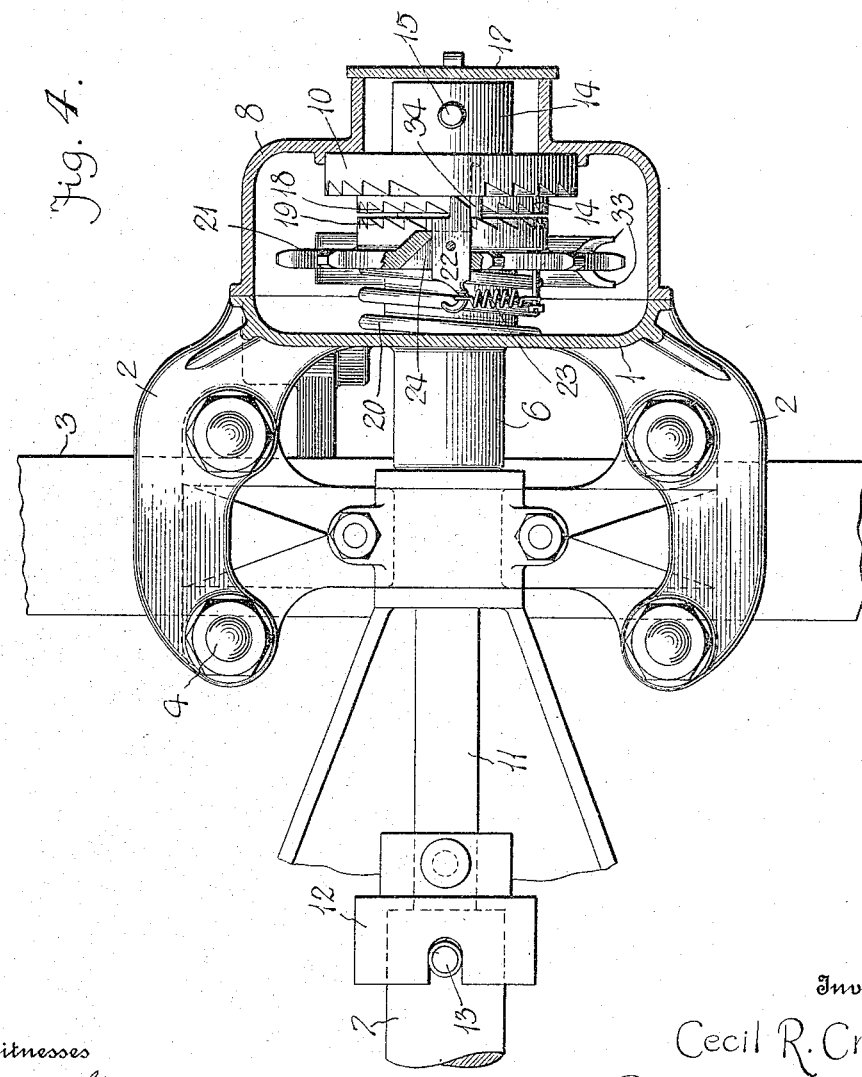

UNITED STATES PATENT OFFICE.

CECIL R. CRARY, OF DETROIT, MICHIGAN, ASSIGNOR TO THE CRARY-EVANS COMPANY, OF DETROIT, MICHIGAN, A CORPORATION OF MICHIGAN.

EXPLOSIVE-ENGINE STARTER.

1,176,737. Specification of Letters Patent. Patented Mar. 28, 1916.

Application filed April 3, 1915. Serial No. 18,943.

*To all whom it may concern:*

Be it known that I, CECIL R. CRARY, a citizen of the United States of America, residing at Detroit, in the county of Wayne and State of Michigan, have invented certain new and useful Improvements in Explosive-Engine Starters, of which the following is a specification, reference being had therein to the accompanying drawings.

In the operation of mechanical starters for internal combustion motors of the type used in power boats, automobiles and the like, it is desirable that the power be applied by the operator from the latter's station, seat or the like in the most effective manner and that the operator be safeguarded from retrogression of the motor due to back firing. It is also desirable that the starter insure a sufficient number of turns to the motor so that the cylinders indraw sufficiently to become filled with properly charged air from the carbureter.

This invention relates to a starter for automobile engines, motors for boats, aeroplanes or the like and to an arrangement thereof that effectively prevents injury to the operator while at the same time the latter is enabled to manipulate the starter readily from the driver's seat or station.

The invention consists in the matters hereinafter set forth and more particularly pointed out in the appended claims.

Referring to the drawings, Figure 1 is a view in side elevation of the front portion of the automobile and starter, partially broken away to give clear view; Fig. 2 is a view in longitudinal section through the starter with the operating pedal omitted; Fig. 3 is a view, partially in elevation and partially in section, showing the front of the starter with the casing cover removed; and Fig. 4 is a view, partially in plan and partially in section, of the starting mechanism with the operating lever and connection omitted.

In the drawings, a main casing 1 that is appropriately designed to combine strength and lightness is provided with supporting brackets 2 or the like whereby it may be conveniently attached to the front portion 3 of an automobile chassis. As herein shown, the casing is designed to be held by the U-bolts or clips 4 that secure the main front spring 5 of the vehicle to the frame. A bearing boss 6 on the casing is disposed in substantially axial alinement with the motor main shaft 7. A cover 8 that is detachably secured on the casing 1 as by studs 9 or the like supports a ratchet guard ring 10 in axial alinement with the main shaft 7 and bearing 6.

A starting shaft 11 journaled in the bearing 6 is appropriately coupled by any suitable means, as for example a member 12, to the main shaft 7, a cross pin 13 engaging slots in the member 12 and affording slight variations in alinement of the shafts. Any other suitable means may be used for interconnecting the shafts. A ratchet clutch head 14 is secured as by a cross piece 15 to the outer end of the shaft 11 concentrically with the guard ring 10, the extended end portions of the cross pin 15 affording means for attachment or application of a crank handle, a hinge cover or lid 17 otherwise shielding the shaft 11. Ratchet teeth 18 on the inner annular face of the head 14 are adapted to mesh with corresponding teeth 19 on the adjacent annular face of the hub of a sprocket wheel 21 that is longitudinally reciprocable and rotatable on the bearing boss 6. A main spring 20 in compression around the hub of the sprocket 21 and in compression between the casing 1 and the web of the wheel, forces the sprocket 21 toward the clutch head 14. A pair of oppositely disposed dogs 22 are pivoted in guide slots of the web of the sprocket 21 and are so disposed that they normally stand in substantially right angles thereto under the influence of spring members 23 or the like. When in such position, with the sprocket in initial position they bear against flat facets on the adjacent annular face of the guard member 10 and prevent the engagement of the ratchet teeth 17 and 18. When the sprocket-wheel moves forward, the dogs 22 drop into ratchet recesses indicated at 24 in the guard member, the shoulders of the recesses swinging the dogs 22 obliquely, thereby allowing the wheel 19 to interlock with the clutch head 14, so that the wheel continues the engagement if turned forward. Retrograde movement of the wheel causes the dogs to reassume their initial position and thereby throw the sprocket out of engagement, the dogs resting on the flat facets against suitable stops 34 when the sprocket is in initial position.

A spring 25 that is connected at one end through the casing, is attached at the other to a sprocket chain 26 that passes around and engages segments of the periphery of the wheel 21, a flexible connection such as a chain 28 extending therefrom around suitable guiding means 29 to the end portion of a lever 30. The lever is appropriately pivoted on the main chassis or other part of the vehicle, so that a pedal 31 on the forward end thereof is within operative range of the driver's seat 32 or station. As a result of this construction, the forward movement of the pedal 31, which is conveniently obtained by a forward motion of the operator's foot, turns the sprocket wheel 21 in such manner that the dogs are turned obliquely far enough to permit its engagement with the clutch and the consequent rotation of the motor. To provide for the riding up of the spring 25 on to the sprocket, this arrangement allowing compactness of construction, the portion of the wheel periphery that is not toothed, is provided with flanges 33 that guide the chain spring into alinement. If the motor "kicks back", the resultant backward movement of the sprocket moves the dogs into released or initial position and forces the sprockets and clutch head apart, thereby preventing damage to the operator. The guard pins 34 limit the retrograde movement of the sprocket wheel so that it remains in initial position. The starter thus presents the feature of being easily manipulated from the operator's station without danger to the latter and without particular exertion on his part, as the main lever is in a position where it is moved forward most readily by the extension of the operator's limb. The device does not add any weight appreciably to the car and as its parts are not in operation except during the starting process, it has little wear and it is consequently comparatively free from liability to break down or other derangement. The leverage that is obtained enables an operator to spin any motor of ordinary size and the device as a whole is readily adjusted to any car as the connection between the lever and the starting mechanism proper are readily adjusted to meet varying requirements of service.

Obviously, changes in the details of construction may be made without departing from the spirit of my invention and I do not care to limit myself to any particular form or arrangement of parts.

What I claim is:—

1. In a mechanical starter for explosive engines, a starter shaft adapted for movement in synchronism with an engine shaft, a casing inclosing the outer end of said starter shaft, a ring fixed in said casing, a clutch member in said ring fixed on said shaft, a rotatable and axially reciprocable operating member adapted for engagement with said clutch member for imparting movement thereto, and pivotal means extending through said operating member normally engaging said ring at right angles thereto to hold said operating member normally out of engagement with said clutch member and adapted to be shifted when moved against portions of said ring to temporarily place said operating member in engagement with said clutch member whereby movement may be imparted to said starter shaft.

2. In a mechanical starter for explosive engines, a starter shaft adapted for movement in synchronism with an engine shaft, a casing inclosing the outer end of said starter shaft, a ring fixed in said casing, a clutch member in said ring fixed on said shaft, a rotatable and axially reciprocable operating member adapted for engagement with said clutch member for imparting movement thereto, and pivotal means carried by said operating member normally engaging said ring and by assuming two angular positions relative to said ring determines the engagement and disengagement of said operating member with said clutch member.

3. In a mechanical starter for explosive engines, a rotatable clutch member adapted to be secured to a motor to turn in synchronism therewith, a rotatable and axially reciprocable operating member adapted to engage with the clutch member for turning the latter when moved clockwise at a speed equal to or greater than the speed of revolution of the clutch member, means extending through said operating member adapted to assume an abnormal angular relation to said operating member when said operating member moves counter-clockwise to positively release the operating member from the clutch and automatically assume normal position to hold it disengaged whereby said operating member may move counter-clockwise, means for rotating the operating member, and means for mounting the assembled mechanism in operative relation to a motor.

4. In a mechanical starter for explosive engines, a casing, a starting shaft journaled therein and provided with a clutch member thereon, an operating member rotatable and longitudinally reciprocable on the shaft, a spring adapted to project the operating member into locking engagement with the clutch member, pivoted dogs extending through said operating member, a guard ring in the casing adapted to engage the dogs and hold them inoperative when the operating member and clutch member are turning in synchronism and to throw the dogs into released position for moving the operating member out of engagement with the clutch member, and an operating lever and means between the operating lever and the operating member for oscillating the clutch member on said shaft.

In testimony whereof I affix my signature in presence of two witnesses.

CECIL R. CRARY.

Witnesses:
ANNA M. DORR,
C. R. STICKNEY.

Copies of this patent may be obtained for five cents each, by addressing the "Commissioner of Patents, Washington, D. C."